United States Patent [19]

LeDesma

[11] Patent Number: 5,066,234
[45] Date of Patent: Nov. 19, 1991

[54] EDUCATIONAL TOY AND METHOD THEREFOR

[76] Inventor: Laura L. LeDesma, 648 W. Pantera, Mesa, Ariz. 85210

[21] Appl. No.: 537,823

[22] Filed: Jun. 14, 1990

[51] Int. Cl.$^5$ .............................................. G09B 1/00
[52] U.S. Cl. .................................. 434/205; 434/207; 434/258; 434/429
[58] Field of Search ................ 434/97, 205, 207, 247, 434/258, 259, 260, 367, 393, 433, 429; 273/1 G, 273, 302

[56] References Cited

U.S. PATENT DOCUMENTS

| | | | |
|---|---|---|---|
| 1,244,000 | 10/1917 | Soltoft | 434/205 |
| 1,359,646 | 11/1920 | Zion | 273/273 X |
| 2,417,216 | 3/1947 | Sayre | 273/273 |
| 3,010,226 | 11/1961 | Kalnins | 273/302 |
| 3,357,116 | 12/1967 | Bazacos | 434/205 X |
| 4,146,977 | 4/1979 | Barberi | 434/207 |
| 4,378,214 | 3/1983 | Scherer | 434/205 X |
| 4,666,163 | 5/1987 | Hirschfeld | 434/205 X |

Primary Examiner—Robert Bahr
Assistant Examiner—Rachel M. Healey
Attorney, Agent, or Firm—Harry M. Weiss

[57] ABSTRACT

An educational toy for use in teaching a child the concepts of geometrical shapes, color, numbers, and sets of numbers. The toy includes a small can for storing the clips, and a large can for storing the small can, and a cover for the large can. The clip has a front board, a rear board, and an effortless spring-biased hinge. The front boards have a series of numbers, and the rear boards have a series of colored shapes, one number and one colored shape per clip. The small can has a series of panels and the large can has a series of panels, each series extending in a peripheral direction on the surface thereof. The panels on the small can have a gradually increasing number of figures; and the panels on the large can have a gradually increasing number of colored shapes. The child matches the numbers or shapes, or colors, in at leasst three different games to the panels of the small can, or the large can, by clipping each clip to a matching panel.

5 Claims, 2 Drawing Sheets

U.S. Patent Nov. 19, 1991 Sheet 1 of 2 5,066,234
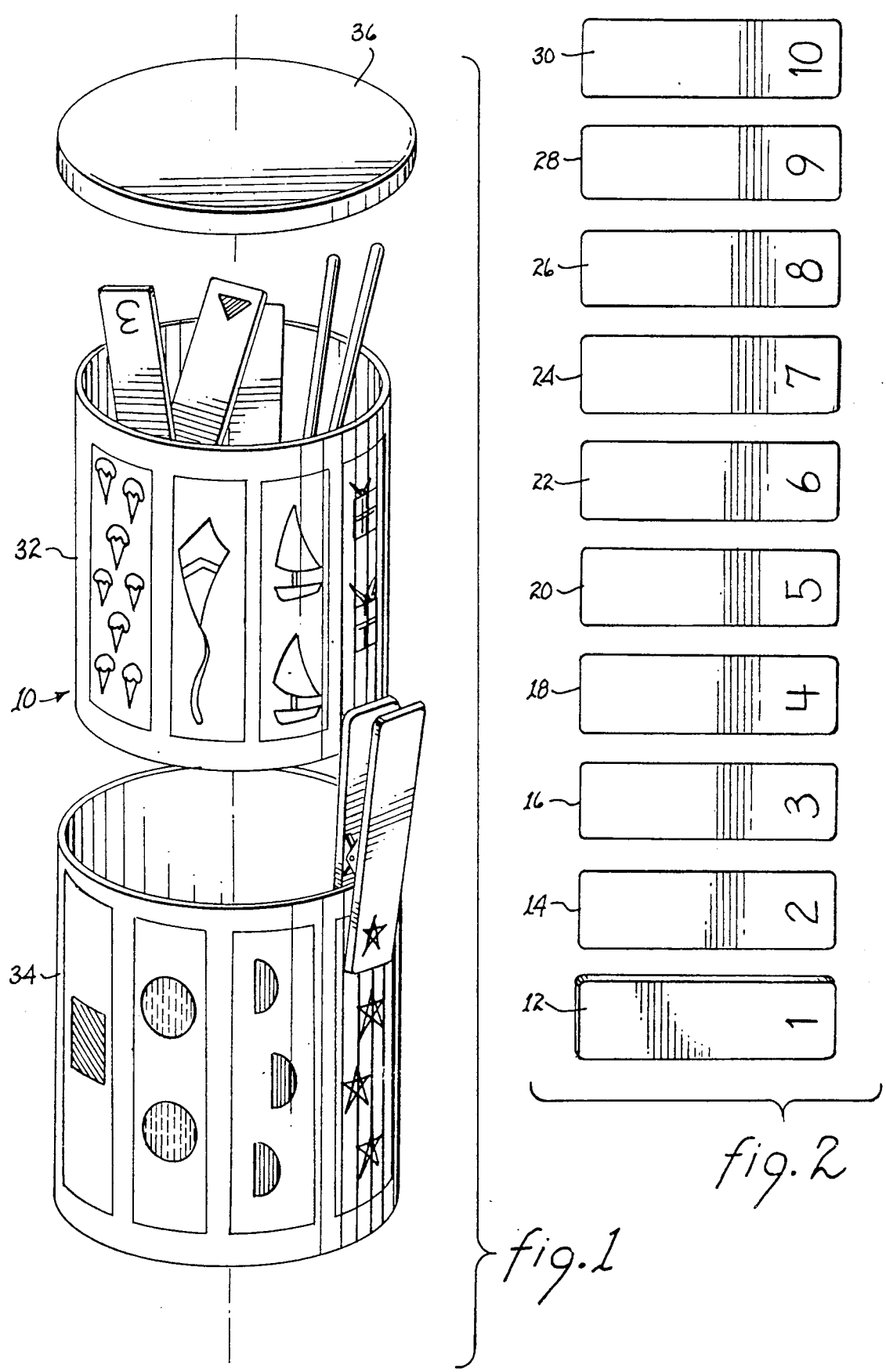

EDUCATIONAL TOY AND METHOD THEREFOR

BACKGROUND OF THE INVENTION

1. Field of the Invention

The invention generally relates to an educational toy and method therefore, and, in particular, the invention relates to an educational toy and method therefore which comprises at least one can having a plurality of pictures, symbols or illustrations thereon and having a plurality of clips with corresponding pictures, symbols, or illustrations.

2. Description of the Prior Art

A number of prior art educational toys are shown, for example, in U.S. Pat. Nos.:

1,244,000, issued Oct. 23, 1917,
2,417,216, issued Mar. 11, 1947,
3,760,511, issued Sept. 25, 1973,
3,773,327, issued Nov. 20, 1973,
3,837,096, issued Sept. 24, 1974, and
4,634,385, issued Jan. 06, 1987.

One problem with these prior art educational toys is that it is difficult for a small child to learn the basic concept of numbers, the basic concept of colors and the basic concept of shapes, while developing the use of the fingers and the hands, in an educational as well as an entertaining or interesting fashion. They are also a potential choking hazard because they contain small parts.

SUMMARY OF THE INVENTION

According to the present invention, an educational toy is provided. This toy comprises a plurality of finger-operated clips, each having a front board and a rear board with a spring disposed therebetween, and comprises preferably an inner can for storing the clips and an outer can for storing the inner can. The inner can and outer can each having an exterior surface containing a plurality of pictures, symbols, or illustrations and the front and rear boards of each clip each have one selected picture, symbol, or illustration corresponding to one of the can pictures, symbols, or illustrations.

By using each of the clips, a small child can learn the concepts of, for example, numbers, colors and geometrical shapes while entertaining himself or herself by placing the clips on the cans at the positions thereof to match the corresponding pictures symbols, or illustrations thereby developing finger dexterity and eye-hand coordination.

The foregoing and other objects, features and advantages will be apparent from the following description of the preferred embodiment of the invention as illustrated in the accompanying drawings.

BRIEF DESCRIPTION OF THE DRAWINGS

FIG. 1 is a perspective view of an educational toy according to the invention;

FIG. 2 is an elevation view of the clips used in the educational toy of FIG. 1 aligned in a row;

DESCRIPTION OF THE PREFERRED EMBODIMENT

Figure 3:
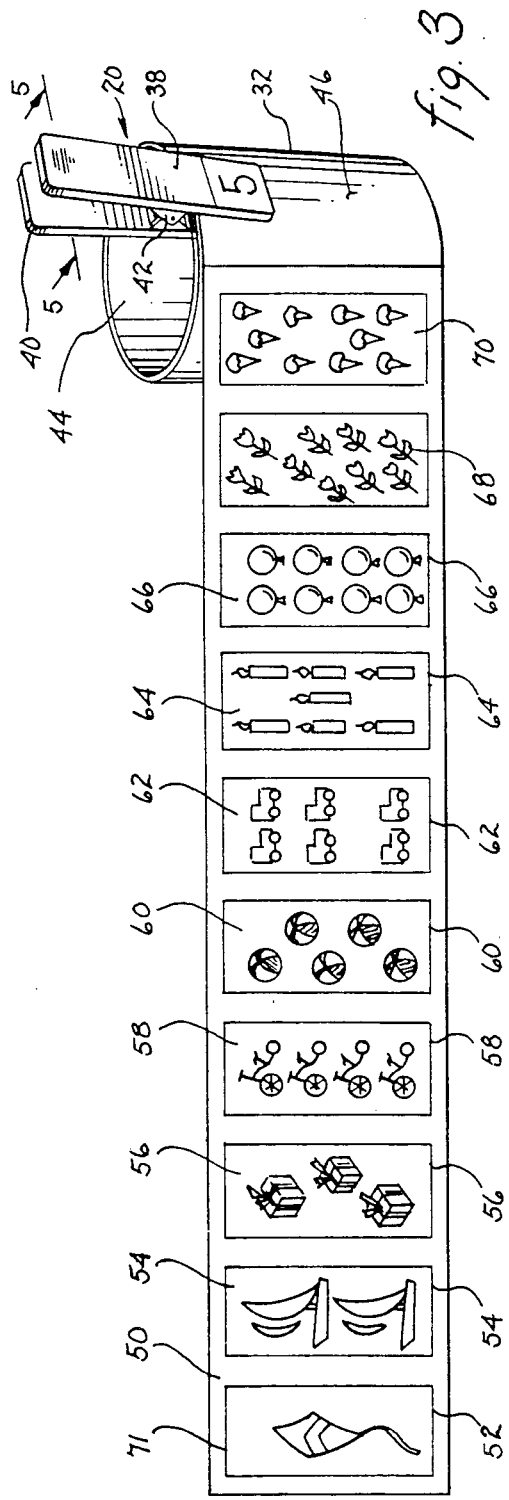
FIG. 3 is a developed elevational and perspective view of the first can of the educational toy of FIG. 1.

As shown in FIG. 1, an educational toy 10 is provided. Toy 10 has ten clips 12, 14, 16, 18, 20, 22, 24, 26, 28, 30. Toy 10 also has a first can 32, which holds the clips during storage thereof. Toy 10 also has a second can 34, which is larger than the first can 32, and which has a cover 36. Typical clip 20, which is the same in structure as the other clips, has a front board 38 and a rear board 40 and a hidden effortless type spring-actuated hinge 42.

FIG. 2 shows the clips used in FIG. 1 with the numbers 1-10, shown on the front side of the clips. The back of each of the ten clips carries the appropriate symbol (not shown in FIG. 2).

As shown in FIG. 3, first can 32 has a cavity 44 and has an outer surface 46. Outer surface 46 has an exterior surface 50, as shown in the developed view thereof. Preferably, the symbols, pictures or illustrations are painted on the can, however, for ease in illustration, the exterior surface 50 is shown as separated from the can when it is actually the exterior surface of the can. Exterior surface 50 has ten sections or panels or pictures 52, 54, 56, 58, 60, 62, 64, 66, 68, 70. Each of the pictures has one or more figures that are disposed thereon. The pictures respectively contain or show, for example, 1 kite, 2 sailboats, 3 presents, 4 tricycles, 5 beach balls, 6 cars, 7 candles, 8 balloons, 9 flowers, and 10 ice cream cones.

Picture 52, which is typical of the other nine pictures, has a peripheral border line or panel line 71. Front board 38 of each clip has respective numbers 1, 2, 3, 4, 5, 6, 7, 8, 9, 10 marked or disposed thereon. A first game, a child can match one clip to each picture on first can 32, by matching the numbers on the front board 38 to the numbers of figures in the picture. A child can also play this game using the second can 34 in place of first can 32. If desired, multiple cans of any desired number can be used.

Figure 4:
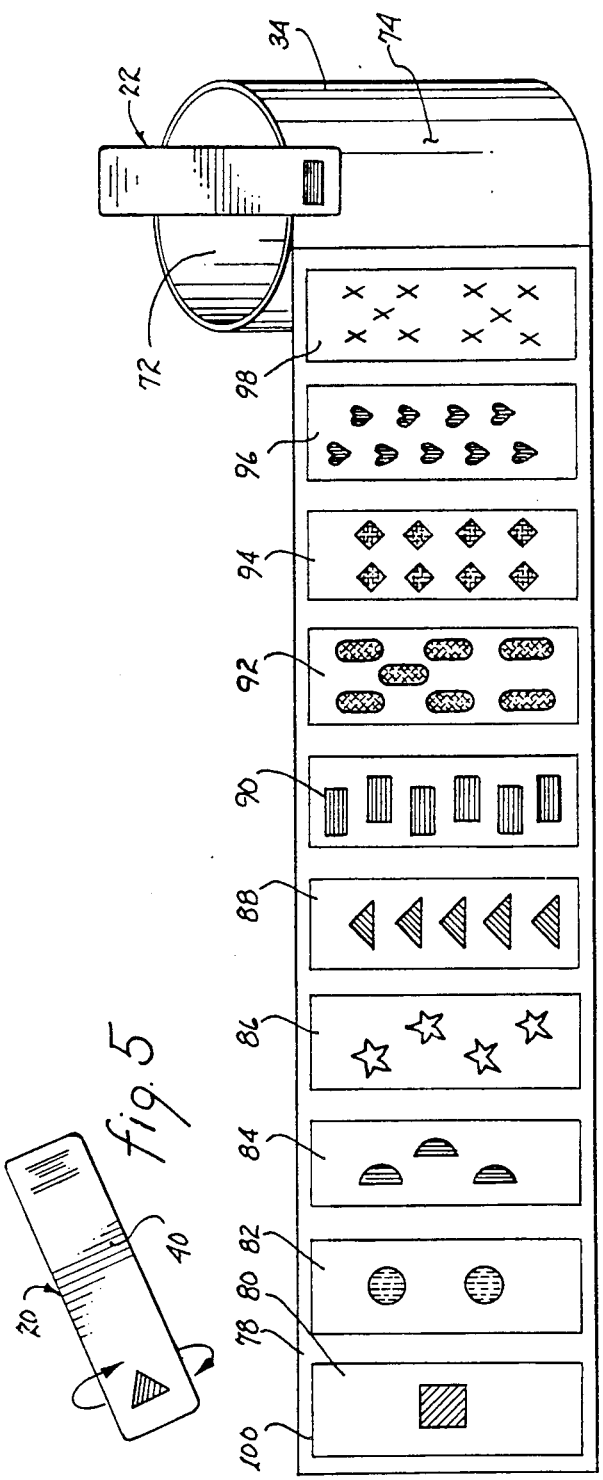
FIG. 4 is a developed educational and perspective view of the second can of the toy of FIG. 1.
Figure 5:
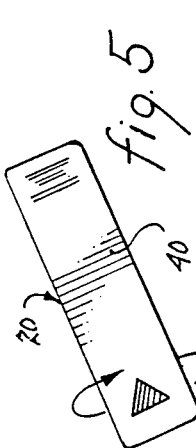
FIG. 5 is a section view as taken along line 5—5 of FIG. 3 depicting one of the two positions of one of the clips of the educational toy of this invention.

As shown in FIG. 4, second can 34 has a second cavity 72 and has a second outer surface 74. Outer surface 74 has an exterior surface 78. Surface 78 has ten sections or pictures or panels 80, 82, 84, 86, 88, 90, 92, 94, 96, 98, each of which has one or more shapes disposed thereon that have a selective color. The pictures respectively include: one square with a green color, two circles with a purple color, three semicircles with a pink color, four stars with a white color, five triangles with a brown color, six rectangles with a navy color, seven ovals with an orange color, eight diamonds with a light yellow color, nine hearts with a red color, and ten criss-crosses with a black color.

Picture 80, which is typical of the other nine pictures, has a peripheral boarder or panel line 100. Rear board 40 of clips 12, 14, 16, 18, 20, 22, 24, 26, 28, 30, have respective shapes with a selective color.

In a second game, a child can attach one clip to each picture, by matching the shape on the rear board 40 of the clip to the shape on the picture. In the third game, a child can match the color on the rear board 40 to the color on the shape of the picture.

In summary, one game presents a good opportunity to memorize colors. The child matches the color on typical clip 22 to the color on the can 34. The other game challenges a child to recall shapes. The child matches the shape on a typical clip 20 or 22 to the shape on the can 34, and clips the clip to it. The still other game encourages children to recognize the numbers 1 through 10 and number sets. The child takes the clip with the number on it, such as typical clip 20, and matches it to the number set on the can 32 or 34, and clips the clip to it. All three games teach the concepts of matching, and colors, and shapes, and numbers, and number sets.

The advantages of toy 10 are indicated hereafter.

A) Toy 10 teaches the concepts of matching, and colors, and shapes, and numbers, and number sets.

B) Toy 10 develops eye-hand coordination, and improves visual perception.

C) Toy 10 makes learning fun.

D) Toy 10 develops thinking and motor coordination, encourages small muscle development, and finger dexterity.

The material used for the clips and cans 32, 34 and cover 36 is preferably a durable plastic material. The material of hinge is preferably a metal material.

While the invention has been described in its preferred embodiment, it is to be understood that the words which have been used are words of description rather than limitation and that changes may be made within the purview of the appended claims without departing from the true scope and spirit of the invention. The embodiments of an invention in which an exclusive property or right is claimed, are defined as follows.

I claim:

1. An educational toy comprising:
   a plurality of clips;
   a first can having a cavity for storing the clips;
   a larger second can having a cavity for storing the first can and having a cover;
   each clip having a front board, a rear board, and a hinge connected to the front and rear boards;
   the front board having respective numbers in a series disposed thereon;
   the rear board having respective shapes with a selective color disposed thereon;
   the first can having a plurality of first panels arranged in series disposed in a peripheral direction on the outer surface thereof;
   the first panels having a series of different figures arranged in an increasing number of figures;
   the second can having a plurality of second panels arranged in series and disposed in a peripheral direction on the outer surface thereof;
   the second panels having a series of different geometrical shapes arranged in an increasing number of shapes; and
   the shapes on each second panel having a selective color different from colors of the other second panels.

2. The toy of claim 1, wherein the first can and the second can each have an exterior surface for displaying its panels.

3. A method of providing an educational game including the steps of:
   providing a plurality of clips, each having a front board and a rear board and an effortless spring-biased hinge;
   providing a small can for storing the clips;
   providing a large can for storing the small can and having a cover;
   adding numbers of a selective series to the front boards of the clips;
   adding shapes of a selective group in a series to the rear boards of the clips;
   adding colors of a selective group in a series to the shapes located on the rear boards;
   adding panels to an outer surface of the small can and the large can, the panels being the same quantity on each can as the number of clips;
   adding a progressively increasing series of groups of figures to the panels on the small can;
   adding a progressively increasing series of groups of the shapes to the panels on the large can; and
   adding the selective group of colors in a series to the corresponding shapes on the panels of the large can.

4. An educational toy comprising:
   a plurality of clips;
   a first can having a cavity for storing the clips;
   a larger second can having a cavity for storing the first can and having a cover;
   each clip having a front board and a rear board, and an effortless connection means for connecting the front and rear boards;
   one of said boards having respective numbers disposed thereon;
   the other of said boards having respective shapes having a selective color disposed thereon;
   the first can having a plurality of first panels arranged in series disposed in a peripheral direction on the outer surface thereof;
   the first panels having a series of different figures;
   the second can having a plurality of second panels arranged in series and disposed in a peripheral direction on the outer surface thereof; and
   the second panels having a series of different geometrical shapes.

5. The educational toy of claim 4 wherein the shapes on each of the second panels having a selective color thereon, each of said clips having a color to match one of the selective colors of said second panels.

* * * * *